(12) United States Patent
Shetzer

(10) Patent No.: US 11,708,166 B2
(45) Date of Patent: Jul. 25, 2023

(54) AIRCRAFT ANTI-ICING SYSTEM

(71) Applicant: ROHR, INC., Chula Vista, CA (US)

(72) Inventor: Daniel J. Shetzer, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 24 days.

(21) Appl. No.: 17/196,803

(22) Filed: Mar. 9, 2021

(65) Prior Publication Data

US 2021/0309374 A1 Oct. 7, 2021

Related U.S. Application Data

(60) Provisional application No. 63/006,292, filed on Apr. 7, 2020.

(51) Int. Cl.
*B64D 15/04* (2006.01)
*B64D 29/00* (2006.01)

(52) U.S. Cl.
CPC ............ *B64D 15/04* (2013.01); *B64D 29/00* (2013.01)

(58) Field of Classification Search
CPC ................................ B64D 15/04; B64D 29/00
See application file for complete search history.

(56) References Cited

U.S. PATENT DOCUMENTS

| | | | | |
|---|---|---|---|---|
| 4,603,824 A * | 8/1986 | McArdel | ............... | B64D 15/04 244/134 B |
| 4,615,499 A * | 10/1986 | Knowler | ............... | B64D 15/04 244/134 B |
| 5,011,098 A * | 4/1991 | McLaren | ............... | B64D 27/14 244/134 B |
| 5,807,454 A | 9/1998 | Kawabe et al. | | |
| 5,873,544 A * | 2/1999 | Pike | ...................... | B64D 45/02 285/302 |
| 6,079,670 A * | 6/2000 | Porte | ...................... | F02C 7/047 165/173 |
| 6,394,396 B2 * | 5/2002 | Gleine | ...................... | B64C 3/46 244/1 N |
| 6,702,233 B1 * | 3/2004 | DuPont | .................. | B64D 15/04 244/134 B |
| 7,766,281 B2 * | 8/2010 | Lorkowski | ................ | B64C 3/50 244/210 |
| 8,061,657 B2 * | 11/2011 | Rocklin | .................. | B64D 15/04 138/116 |
| 9,255,523 B2 | 2/2016 | Todorovic et al. | | |

(Continued)

FOREIGN PATENT DOCUMENTS

GB 1600454 10/1981

OTHER PUBLICATIONS

European Patent Office, European Search Report dated Aug. 13, 2021 in Application No. 21167268.8.

*Primary Examiner* — Philip J Bonzell
*Assistant Examiner* — Michael B. Kreiner
(74) *Attorney, Agent, or Firm* — Snell & Wilmer L.L.P.

(57) ABSTRACT

An aircraft anti-icing system is disclosed. A tube having a plurality of outlet ports is disposed within an interior of an outer housing in spaced relation to a closed end of this outer housing. The exterior of the outer housing includes a leading edge at its closed end. The tube is anchored relative to the outer housing by one or more brackets that extend from the tube to the outer housing. An open end of the outer housing may be closed by an aft wall that encloses the tube within an interior compartment of the outer housing.

13 Claims, 5 Drawing Sheets

(56) References Cited

U.S. PATENT DOCUMENTS

| | | |
|---|---|---|
| 9,347,337 B2 | 5/2016 | Hindle et al. |
| 11,299,280 B2 * | 4/2022 | Burton .................. B64D 15/04 |
| 2012/0318922 A1 | 12/2012 | Saito et al. |

* cited by examiner

AIRCRAFT ANTI-ICING SYSTEM

CROSS-REFERENCE TO RELATED APPLICATIONS

This patent application is a non-provisional patent application of, and claims the benefit of, U.S. Provisional Patent Application Ser. No. 63/006,292, that is entitled "AIRCRAFT ANTI-ICING SYSTEM," that was filed on 7 Apr. 2020, and the entire disclosure of which is hereby incorporated by reference in its entirety herein.

FIELD

The present disclosure generally relates to aircraft and, more particularly, to anti-icing systems for aircraft.

BACKGROUND

Aircraft jet engine exhaust gases or bleed air in aircraft anti-icing systems are used to address the formation of ice on aircraft wings, engine inlets (e.g., inlet cowlings), and the like. Generally, jet engine anti-icing systems may direct a hot gas (e.g., air obtained from the jet engine) and may direct the hot gas into one or more tubes (e.g., piccolo tubes). The tube or tubes may be positioned to discharge hot gases in a direction tangent to the center line of a housing that contains the tube(s), thereby causing the hot gases to entrain air within the housing and swirl within the housing interior. This entrainment and swirl enables the heat transfer to be sufficient to address the formation of ice on the housing exterior.

SUMMARY

An aircraft anti-icing system is presented herein. The configuration of such an aircraft anti-icing system, the operational characteristics of such an aircraft anti-icing system, and the assembly of such an aircraft anti-icing system are within the scope of this Summary.

An aircraft anti-icing system includes an outer housing (e.g., a wing; an engine nacelle) having a closed end. A leading edge of the outer housing may be defined on an exterior of this closed end of the outer housing. A tube having a plurality of outlet ports may be disposed on an interior side of the outer housing and may be disposed in spaced relation to the closed end of the outer housing. At least one bracket may be attached to and extend from the outer housing to engage and/or support the tube relative to the outer housing.

An aft wall may be attached to the outer housing in spaced relation to its closed end, and this may be done after the tube has already been secured relative to the outer housing. This may define an interior compartment (e.g., an enclosed space) that includes the above-noted tube. The spacing between the tube and the closed end of the outer housing may be less than the spacing between the tube and the aft wall.

The various outlet ports of the tube extend through the entire wall thickness of the tube. A fluid at an elevated temperature and from any appropriate source may be directed into the interior of the tube and discharged therefrom through the various outlet ports. One or more of the outlet ports, and including each of the outlet ports, may project at least generally in the direction of the closed end of the outer housing.

A number of characterization apply to the discharge from one or more of the outlet ports, and including each exposed outlet port of the tube (e.g., "exposed" contemplating not being blocked by a corresponding bracket). Outlet ports may directly fluidly interface with a single, common space, including where the entire boundary of this common space is an inner perimeter of the outer housing. This single, common space may both extend from each exposed outlet port to the closed end of the outer housing, and furthermore may extend between each adjacent pair of outlet ports proceeding along an outer perimeter of the tube. Such a single, common space may also be disposed about the entire circumference or perimeter of the tube at all locations where the tube is not engaged by a bracket. Such a single, common space may extend from the closed end to the aft wall without engaging any structure, except for those locations occupied by the tube and each bracket that interconnects the tube with the outer housing (e.g., the tube and each interconnecting bracket may be the only structures within the interior compartment).

Any feature that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a bracket attaches a tube to an outer housing alone does not mean that only a single bracket attaches a tube to the outer housing). Moreover, any failure to use phrases such as "at least one" also does not limit the corresponding feature to the singular (e.g., indicating that a tube is attached to an outer housing with a bracket alone does not mean that the tube is attached to the outer housing with a single bracket). Use of the phrase "at least generally" or the like in relation to a particular feature encompasses the corresponding characteristic and insubstantial variations thereof (e.g., indicating that a tube includes an outer perimeter that is at least generally cylindrical encompasses the outer perimeter being cylindrical). Finally, a reference of a feature in conjunction with the phrase "in one embodiment" does not limit the use of the feature to a single embodiment.

Various aspects are also addressed by the following paragraphs and in the noted combinations:

1. An aircraft anti-icing system comprising:
an outer housing comprising a leading edge on a closed end of said outer housing;
an aft wall attached to said outer housing in spaced relation to said closed end;
an interior compartment collectively defined by said outer housing and said aft wall;
a bracket attached to and extending from said outer housing into said interior compartment; and
a tube comprising a plurality of outlet ports, wherein said tube is engaged by said bracket within said interior compartment at a location that is spaced from said closed end of said outer housing.

2. The aircraft anti-icing system of paragraph 1, wherein said outer housing is selected from the group consisting of an aircraft wing and an aircraft engine nacelle.

3. The aircraft anti-icing system of any of paragraphs 1-2, wherein said leading edge is on an exterior surface of said closed end of said outer housing and is a leading surface of said outer housing when directed through air in an installed configuration.

4. The aircraft anti-icing system of any of paragraphs 1-3, wherein said closed end of said outer housing is convex relative to an exterior of said outer housing.

5. The aircraft anti-icing system of any of paragraphs 3-4, wherein said closed end of said outer housing comprises a concave interior surface, and wherein said tube is disposed in spaced relation to said concave interior surface at said closed end.

6. The aircraft anti-icing system of any of paragraphs 1-5, wherein said plurality of outlet ports each project at least generally in a direction of said closed end of said outer housing.

7. The aircraft anti-icing system of any of paragraphs 1-6, wherein said outer housing further comprises a first wall extending from a first edge of said closed end of said outer housing and a second wall extending from a second edge of said closed end of said outer housing, wherein said first and second walls are disposed in opposing, spaced relation to one another.

8. The aircraft anti-icing system of paragraph 7, wherein said bracket is attached to only one of said first wall and said second wall.

9. The aircraft anti-icing system of paragraph 8, wherein said bracket is attached to said first wall at a location that is between said aft wall and said tube in a dimension that said aft wall and said closed end of said outer housing are spaced from one another.

10. The aircraft anti-icing system of any of paragraphs 1-9, wherein said bracket cantilevers from said outer housing.

11. The aircraft anti-icing system of any of paragraphs 1-10, wherein said tube is detachably connected with said bracket.

12. The aircraft anti-icing system of any of paragraphs 1-11, wherein said bracket extends from said outer wall both inwardly and in a direction of said closed end of said outer housing for engagement with said tube.

13. The aircraft anti-icing system of any of paragraphs 1-12, wherein each exposed outlet port of said plurality of outlet ports fluidly interfaces with a single common space that both extends from each said exposed outlet port to said closed end of said outer housing and extends between each adjacent pair of said exposed outlet ports.

14. The aircraft anti-icing system of any of paragraphs 1-12, wherein a first length segment of said tube extends from said bracket, wherein multiple outlet ports of said plurality of outlet ports are incorporated by said first length segment of said tube, wherein an open space is disposed about an outer perimeter of said first length segment of said tube and said open space also extends from said first length segment of said tube to said closed end of said outer housing.

15. An aircraft comprising a fuselage, a first wing, a first engine, a second wing, a second engine, and the aircraft anti-icing system of any of paragraphs 1-14.

16. The aircraft of paragraph 15, wherein said first engine comprises a nacelle, and wherein said outer housing comprises said nacelle.

17. The aircraft of paragraph 15, wherein said outer housing comprises said first wing.

18. A method of assembling an aircraft anti-icing system, comprising:

anchoring a tube to an outer housing, wherein said outer housing comprises a closed end in turn comprising a leading edge, wherein said tube is disposed on an interior side of said outer housing and comprises a first length segment that in turn comprises a plurality of outlet ports, and wherein said anchoring step comprises providing an open space that is disposed about a perimeter of said first length segment and that extends from said tube to said closed end of said outer housing; and attaching an aft wall to said outer housing at a location that is spaced from said closed end of said outer housing, wherein said attaching step is executed after said anchoring step.

19. The method of paragraph 18, wherein said anchoring step comprises attaching a plurality of brackets to said outer housing.

20. The method of any of paragraphs 18-19, wherein said anchoring step comprises attaching said bracket from said interior side of said outer housing.

21. The method of any of paragraphs 18-19, wherein said method comprises installing the aircraft anti-icing system of any of paragraphs 1-14.

DETAILED DESCRIPTION

Figure 1:
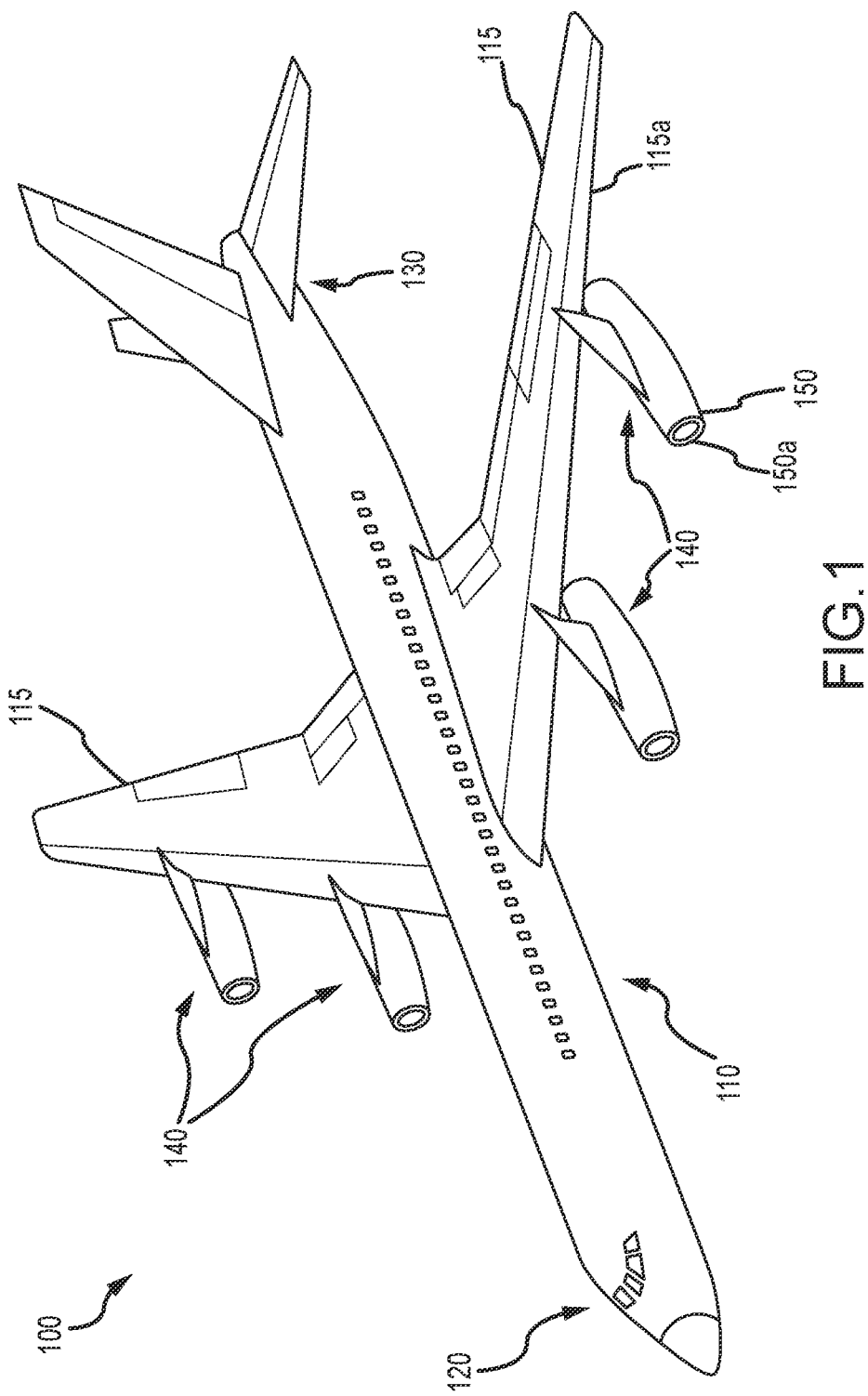
FIG. 1 is a perspective view of a representative aircraft, in accordance with various embodiments.

With reference to FIG. 1, there is illustrated an example aircraft 100 that may integrate an aircraft anti-icing system in accordance with FIGS. 3-5 that will be discussed in more detail. The aircraft 100 includes a fuselage 110 and wings 115. Each wing 115 has a corresponding leading edge 115a (e.g., a "leading" structure/surface of the corresponding wing 115 during movement of the aircraft 100 through the air). The fuselage 110 includes a cockpit 120 and a tailcone 130, which can be substantially integral to the fuselage 110. The aircraft 100 also includes engines 140 which can be affixed to the wings 115 and/or to the fuselage 110, and that may be controlled in any appropriate manner (e.g., by one or more control systems, for example one or more engine control systems). As used herein, the term "engine" is to be understood as including the engines themselves and nacelles 150 which contain the engines. Each nacelle 150 includes a leading edge 150a (e.g., a "leading" structure/surface of the nacelle 150 during movement of the aircraft 100 through the air). Although shown in FIG. 1 generally as a turbofan aircraft in which the engines 140 are gas turbine engines, it should be noted that the aircraft 100 can be any suitable type of aircraft having any suitable number of engines of any suitable type.

Figure 2:
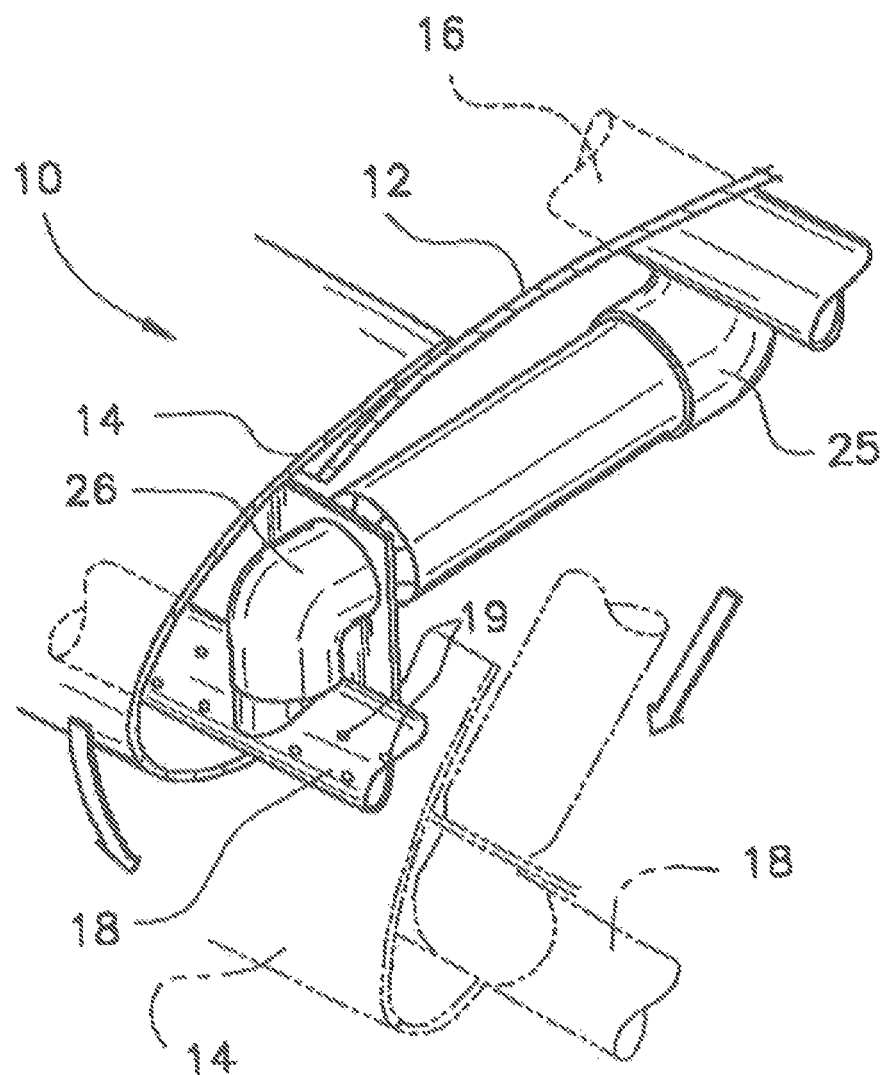
FIG. 2 is a simplified, cross-sectional view of the leading edge of an aircraft wing having a moveable slat and a slidable duct assembly interconnected to a spray duct, in accordance with various embodiments.

FIG. 2 is a cross-sectional view of a portion of a leading edge 10 of an airplane wing. Shown is a fixed wing portion 12 and a moveable wing slat 14. The wing slat 14 is normally retracted to nest against the wing's leading edge when in high-altitude flight and is deployed by a suitable actuator into the illustrated broken-line position for takeoffs and landings. Hot, compressed bleed air is conducted from the aircraft engine (e.g., engine 140 in FIG. 1) to a suitable transfer point on the wing's leading edge. From the supply duct 16, the bleed air is conducted to a tube or spray duct 18 running lengthwise in the wing slat 14. Transitional joints 25 and 26 enable the bleed air to be conveyed from supply duct 16 to spray duct 18. Openings 19 in the spray duct 18 deliver the bleed air to the interior surface of the wing slat 14.

Figure 3:
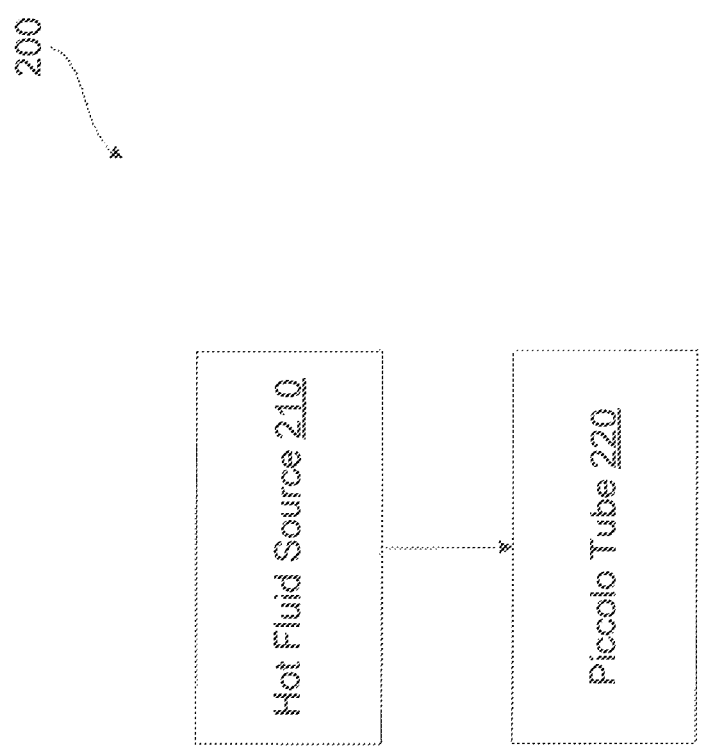
FIG. 3 a schematic of an aircraft anti-icing system, in accordance with various embodiments.

An aircraft anti-icing system is illustrated in FIG. 3 and is identified by reference numeral 200. The aircraft anti-icing system includes a hot fluid source 210 (e.g. exhaust from one or more of the engines 140 of the aircraft 100 of FIG. 1; heated air from one or more of the engines 140 of the aircraft 100 of FIG. 1). The hot fluid source 210 is fluidly connected with one or more tubes 220 (e.g., at least generally in accordance with the duct 18 shown in FIG. 2; which may be referred to as a "piccolo tube"). One or more tubes 220 could be disposed in proximity to (but spaced from) the leading edge 150a of one or more of the engines 140 of the aircraft 100 of FIG. 1, could be disposed in close proximity to (but spaced from) the leading edge 115a of at least one of its wings 115, or both.

Figure 4:
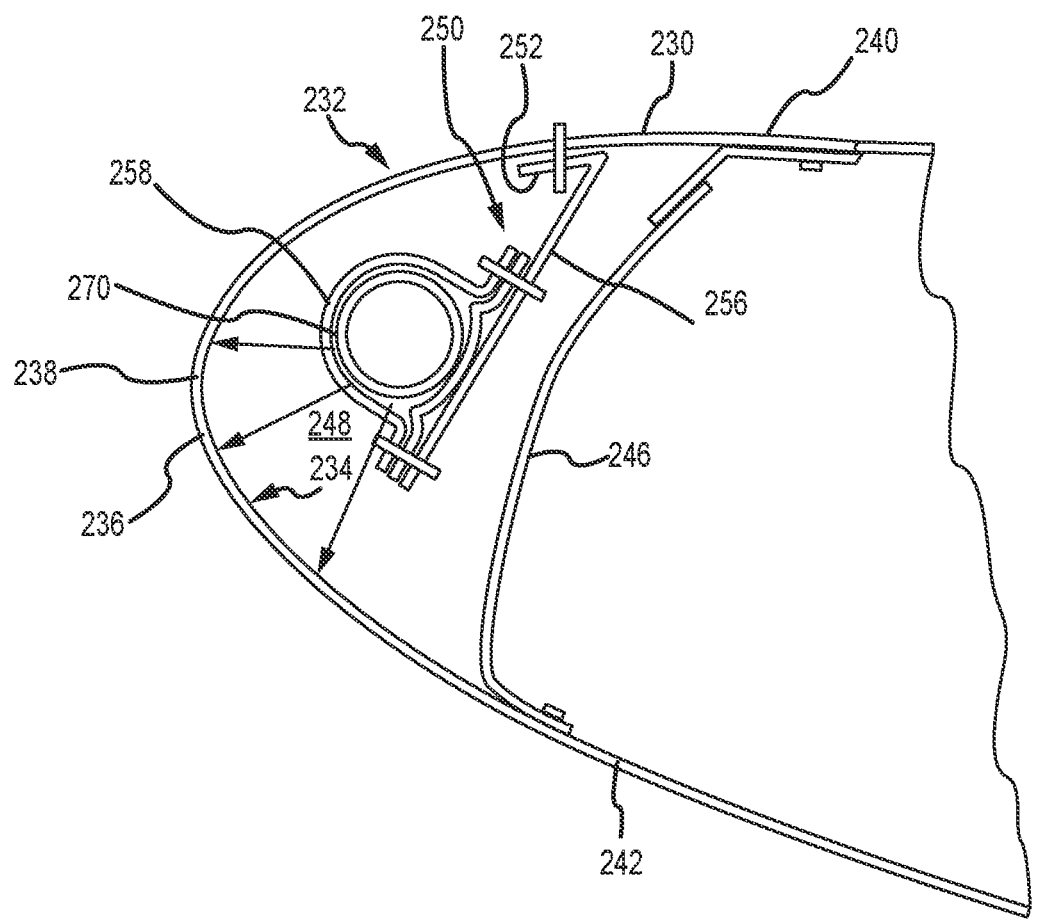
FIG. 4 is a schematic of an aircraft anti-icing system having a tube attached to an outer housing of the aircraft and where this tube includes multiple outlet ports, all in accordance with various embodiments.

FIG. 4 illustrates a portion of an aircraft anti-icing system in accordance with FIG. 3. An outer housing 230 includes a closed end 236 having a leading edge 238. The closed end 236 is convex on an exterior of the outer housing 230 (e.g., an exterior surface 232 of the outer housing 230 at the closed end 236 may be convex) and is concave on an interior of the outer housing 230 (e.g., an interior surface 234 of the outer housing 230 at the closed end 236 may be concave). The outer housing 230 could be a nacelle 150 for the aircraft 100 of FIG. 1, could be a leading portion of a wing 115 for the aircraft 100 of FIG. 1, or both. The outer housing 230 further includes a first perimeter wall 240 (e.g., lipskin, which encompasses a single piece of lipskin as well as multiple lipskin segments) that extends from one edge of the closed end 236 (e.g., an upper wall of a wing 115; an outboard wall of a nacelle 150) and a second perimeter wall 242 (e.g., lipskin, which encompasses a single piece of lipskin as well as multiple lipskin segments) that extends from an opposite edge of the closed end 236 (e.g., a lower wall of a wing 115; an inboard wall of a nacelle 150. The first perimeter wall 240 and the second perimeter wall 242 extend from opposite edges of the closed end 236 of the outer housing, and are disposed in spaced and opposing relation to one another. An aft wall 246 extends from and may be appropriately secured to the first perimeter wall 240 and the second perimeter wall 242 by one or more fasteners. The closed end 236 and the aft wall 246 are disposed in spaced relation to one another. As such, the closed end 236, first perimeter wall 240, second perimeter wall 242, and aft wall 246 collectively define an interior compartment 248.

A tube or conduit (e.g., a piccolo tube) 270 is disposed within the interior compartment 248, and may be used as the tube 220 for the aircraft anti-icing system 200 of FIG. 3. The tube 270 may be of any appropriate configuration proceeding along its length dimension (e.g., primarily axially-extending structure when incorporated by a wing 115; an annular structure when incorporated by a nacelle 150). An outer perimeter 274 of the tube 270 may be at least generally cylindrical or of any appropriate configuration. One or more brackets 250 may be spaced along the length dimension of the tube 270 for interconnecting the tube 270 with the outer housing 230.

The bracket 250 shown in FIG. 4 includes a mounting end or mounting surface 252 that may engage an interior surface 234 of the outer housing 230. A bracket extension 256 extends from the mounting surface 252 to dispose the tube 270 in spaced relation to the outer housing 230. A clamping or tube engagement section 258 of the bracket 250 engages (e.g., detachably) the tube 270. Multiple brackets 250 may be spaced along the length dimension of the tube 270 to attach the tube 270 to the outer housing 230.

The bracket 250 is shown as being attached to the first perimeter wall 240 of the outer housing 230, although the bracket 250 could be attached to the second perimeter wall 242.

Generally, the bracket 250 only engages one of the first perimeter wall 240 or the second perimeter wall 242, or more generally only engages the outer housing 230 at a single location. That is, the bracket 250 may be in the form of a cantilever—the bracket 250 cantilevers from the outer housing 230. Various embodiments have the tube 270 being disposed closer to the leading edge 238 of the outer housing 230, measured along a length dimension of the outer housing 230—the dimension in which the aft wall 246 is spaced from the leading edge 238, compared to the mounting surface 252 of the bracket 250. Stated another way, various embodiments include the bracket extension 256 proceeding from its mounting surface 252 both inwardly (e.g., at least generally in the direction of the opposite perimeter wall) and in the direction that the closed end 236 of the outer housing 230 is spaced from where the bracket 250 engages the outer housing 230 (e.g., at least generally in a direction of the closed end 236).

Figure 5:
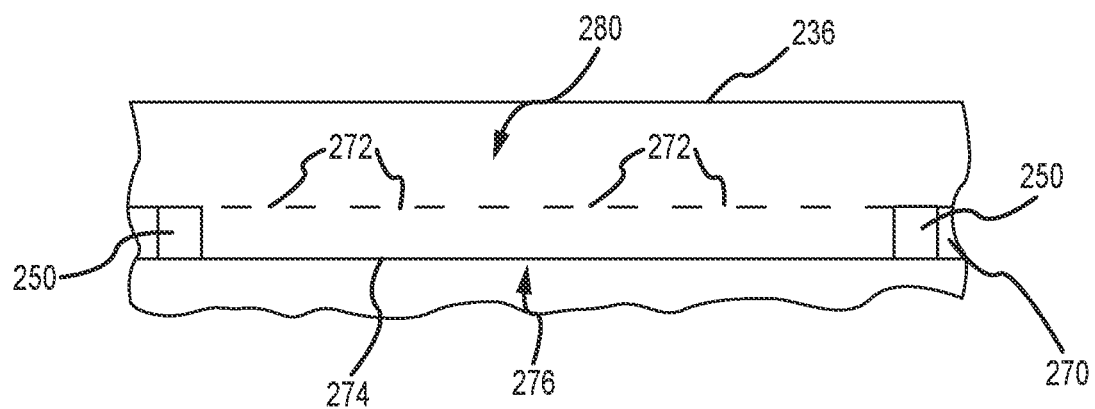
FIG. 5 is a schematic of a first length segment of the tube of FIG. 4 and relative to the closed end of the outer housing of FIG. 4, in accordance with various embodiments.

FIG. 5 illustrates a pair of brackets 250 that are engaging the tube 270 at locations that are spaced along the length dimension of the tube 270. This portion of the tube 270 may be referred to as a first length segment 276, including where the tube 270 includes a plurality of such first length segments 276. A plurality of outlet ports 272 extend through the wall of the tube 270 within the first length segment 276. These outlet ports 272 may be disposed in any appropriate pattern and any appropriate number of multiple outlet ports may be utilized by the first length segment 276. One or more outlet ports 272, including each such outlet port 272, projects toward the interior surface 234 of the outer housing 230 at its closed end 236. Hot fluid (e.g., air and/or one or more gasses) within the tube 270 may then be discharged through the various outlet ports 272 to heat the portion of the interior compartment 248 located between the tube 270 and the closed end 236 of the outer housing 230 (representative flow lines from the outlet ports 272 is shown in FIG. 4). The various outlet ports 272 ports may directly fluidly interface with a single, common space 280 (e.g., discharge directly into this single, common space 280), including where the entire boundary of this common space 280 is provided by an inner perimeter of the outer housing 230.

A common space 280 is disposed about the entire outer perimeter 274 of the tube 270 in the first length segment 276. This common space 280 extends from the outer perimeter 274 of the tube 270 to the interior surface 234 of the outer housing 230 at its closed end 236. Stated another way and in various embodiments, there is no structure between the tube 270 and the interior surface 234 at the closed end 236 of the outer housing 230 which could restrict/impede fluid flow from the tube 270 to the closed end 236. The various outlet ports 272 discharge into a single, common space (e.g., the common space 280). This single common space may lack any flow restrictions proceeding from the tube 270 to the closed end 236 of the outer housing 230). This single common space (e.g., common space 280) may extend from each outlet port 272 to the closed end 236 of the outer housing 230. This single common space (e.g., common space 280) may also extend between each adjacent pair of outlet ports 272 proceeding along the perimeter 274 within the first length segment 276 of the tube 270. Such a single, common space (e.g., common space 280) may extend from the closed end 236 of the outer housing 230 to the aft wall 246 without engaging any structure, except for those locations occupied by the tube 270 and each bracket 250 that interconnects the tube 270 with the outer housing 230 (e.g., the tube 270 and each interconnecting bracket 250 may be the only structures within the interior compartment 248).

The manner in which the tube 270 is integrated with the outer housing 230 is advantageous. At least the portion of the outer housing 230 having the closed end 236 and the first perimeter wall 240 and second perimeter wall 242 may be formed. One or more brackets 250 may be attached to the outer housing 230 at spaced locations to dispose the tube 270 in a more precise, predetermined position relative to the closed end 236 of the outer housing 230. The tube 270 may then be secured relative to the various brackets 250. Alternatively, the tube 270 could be secured to one or more brackets 250 prior to attaching the various brackets 250 to the outer housing 230. In each case, this allows for visual inspection of the installation of the tube 270 to the outer housing 230. After the tube 270 is attached to the outer housing 230 (via one or more brackets 250), and including in a precise, predetermined position relative to the closed end 236 of the outer housing 230, the aft wall 246 may be secured to the outer housing 230 to define the enclosed interior compartment 248.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft anti-icing system comprising:
   an outer housing comprising a leading edge on a closed end of said outer housing, wherein said outer housing further comprises a first wall extending from a first edge of said closed end of said outer housing and a second wall extending from a second edge of said closed end of said outer housing, wherein said first and second walls are disposed in opposing, spaced relation to one another;
   an aft wall attached to said outer housing in spaced relation to said closed end;
   an interior compartment collectively defined by said outer housing and said aft wall;
   a bracket attached to and extending from said outer housing into said interior compartment; and
   a tube comprising an outer perimeter and a plurality of outlet ports extending through the outer perimeter of the tube, wherein said tube is engaged by said bracket within said interior compartment at a location that is spaced from said closed end of said outer housing, and wherein said bracket is attached to only one of said first wall and said second wall at a location that is between said aft wall and said tube in a dimension that said aft wall and said closed end of said outer housing are spaced from one another.

2. The aircraft anti-icing system of claim 1, wherein said outer housing is selected from the group consisting of an aircraft wing and an aircraft engine nacelle.

3. The aircraft anti-icing system of claim 1, wherein said leading edge is on an exterior surface of said closed end of said outer housing and is a leading surface of said outer housing when directed through air in an installed configuration.

4. The aircraft anti-icing system of claim 1, wherein said closed end of said outer housing is convex relative to an exterior of said outer housing.

5. The aircraft anti-icing system of claim 4, wherein said closed end of said outer housing comprises a concave interior surface, and wherein said tube is disposed in spaced relation to said concave interior surface at said closed end.

6. The aircraft anti-icing system of claim 1, wherein said plurality of outlet ports each project at least generally in a direction of said closed end of said outer housing.

7. The aircraft anti-icing system of claim 1, wherein said bracket cantilevers from said outer housing.

8. The aircraft anti-icing system of claim 1, wherein said bracket extends from said outer housing both inwardly and in a direction of said closed end of said outer housing for engagement with said tube.

9. The aircraft anti-icing system of claim 1, wherein each exposed outlet port of said plurality of outlet ports fluidly interfaces with a single common space that both extends from each said exposed outlet port to said closed end of said outer housing and extends between each adjacent pair of said exposed outlet ports.

10. The aircraft anti-icing system of claim 1, wherein a first length segment of said tube extends from said bracket, wherein multiple outlet ports of said plurality of outlet ports are incorporated by said first length segment of said tube, wherein an open space is disposed about an outer perimeter of said first length segment of said tube and said open space also extends from said first length segment of said tube to said closed end of said outer housing.

11. An aircraft comprising a fuselage, a first wing, a first engine, a second wing, a second engine, and the aircraft anti-icing system of claim 1.

12. The aircraft of claim 11, wherein said first engine comprises a nacelle, and wherein said outer housing comprises said nacelle.

13. The aircraft of claim 11, wherein said outer housing comprises said first wing.

* * * * *